United States Patent [19]
Novak

[11] 3,737,271
[45] June 5, 1973

[54] MOLDING APPARATUS HAVING A TUNNEL GATED MOVABLE MOLD MEMBER

[75] Inventor: George J. Novak, Riverside, Ill.

[73] Assignee: Western Electric Company, Incorporated, New York, N.Y.

[22] Filed: Oct. 18, 1971

[21] Appl. No.: 190,295

Related U.S. Application Data

[63] Continuation of Ser. No. 830,617, June 5, 1969, abandoned.

[52] U.S. Cl. ..................... 425/247, 425/441, 249/68, 249/105, 425/DIG. 51, 425/DIG. 5
[51] Int. Cl. ............................. B29c 7/00, B29f 1/14
[58] Field of Search ..................... 249/59, 63, 66, 67, 249/68, 105; 425/DIG. 51, DIG. 5, 242, 247

[56] References Cited

UNITED STATES PATENTS

| | | | |
|---|---|---|---|
| 2,330,369 | 9/1943 | Marsh | 425/250 |
| 2,994,921 | 8/1961 | Hultgren | 425/308 |
| 3,013,303 | 12/1961 | Amazon | 425/308 X |
| 3,120,680 | 2/1964 | Villasana | 249/110 |
| 3,013,308 | 12/1961 | Armour | 18/42 D UX |
| 3,213,490 | 10/1965 | Johnson | 425/444 |
| 3,266,098 | 8/1966 | Bucy | 425/DIG. 5 |
| 3,283,373 | 11/1966 | Kiefer et al. | 425/DIG. 5 |
| 3,373,460 | 3/1968 | Lodney | 425/DIG. 5 |
| 3,381,743 | 5/1968 | Spain | 425/DIG. 5 |
| 3,461,488 | 8/1969 | Croyle | 425/249 |
| 3,496,611 | 2/1970 | Ferdig | 425/250 |

FOREIGN PATENTS OR APPLICATIONS

| | | | |
|---|---|---|---|
| 1,472,402 | 1/1967 | France | 425/DIG. 51 |
| 399,723 | 3/1966 | Switzerland | 425/DIG. 5 |

*Primary Examiner*—J. Howard Flint, Jr.
*Attorney*—H. J. Winegar, A. C. Schwarz, Jr., R. P. Miller et al.

[57] ABSTRACT

In apparatus particularly suited for molding an article of relatively small thickness, a tunnel gate in a movable mold member extends parallel to a parting line of the apparatus so as to define a relatively sharp gate material shearing edge. When the mold member is in a closed molding position the tunnel gate opens into a mold cavity substantially at the parting line of the apparatus and is aligned with a runner channel so that molding material can be introduced into the mold cavity. As the molding apparatus is opened after the molding of an article, the mold member is automatically moved out of engagement with the article in a direction substantially parallel to the parting line of the apparatus, such that the shearing edge severs gate material in the tunnel gate from the article and such that the gate material is withdrawn from the tunnel gate as an integral part of molding material formed in the runner channel.

3 Claims, 9 Drawing Figures

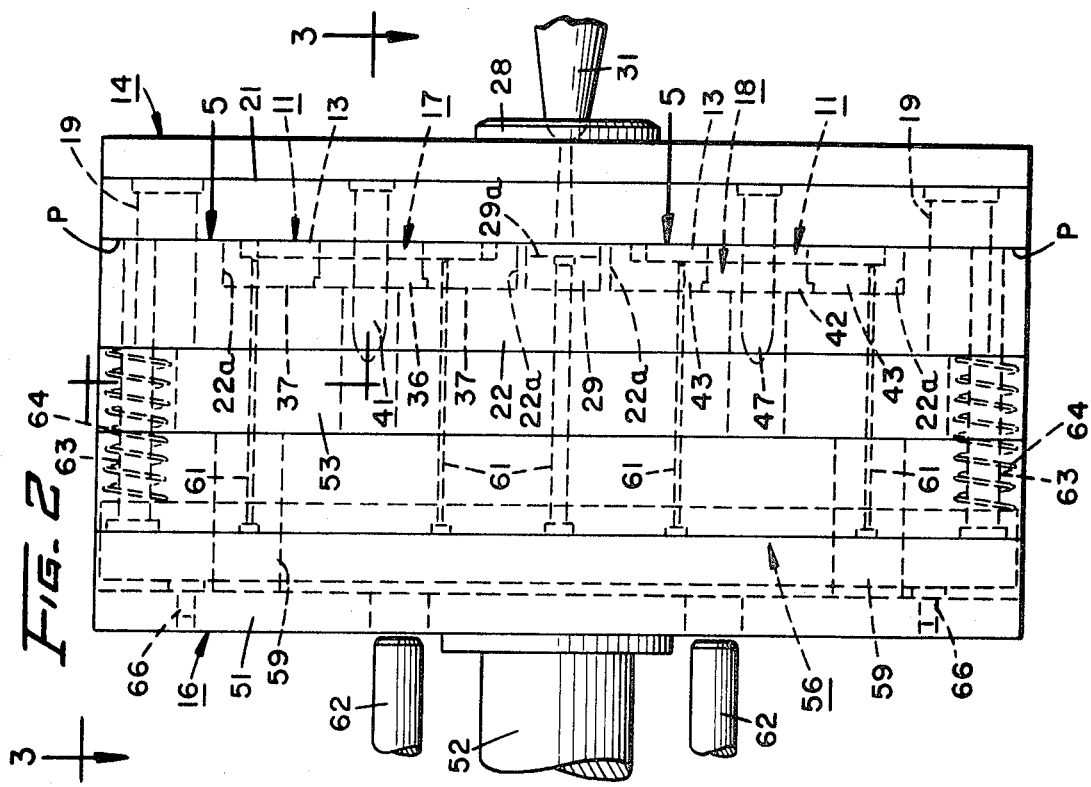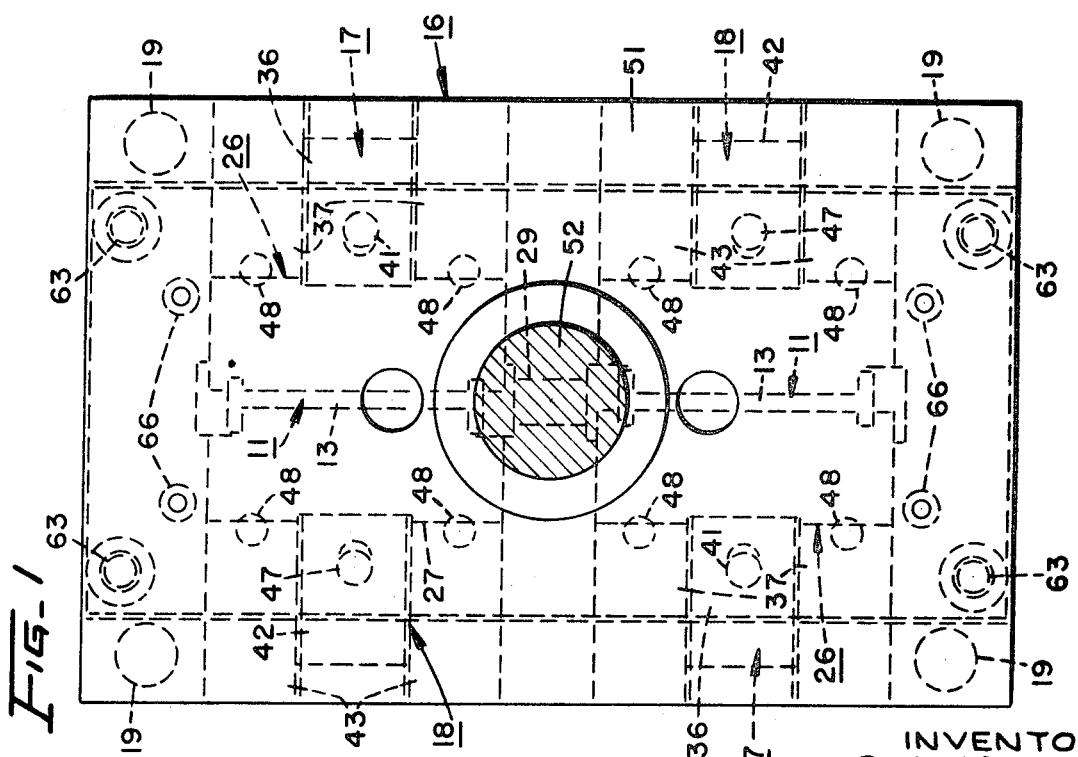

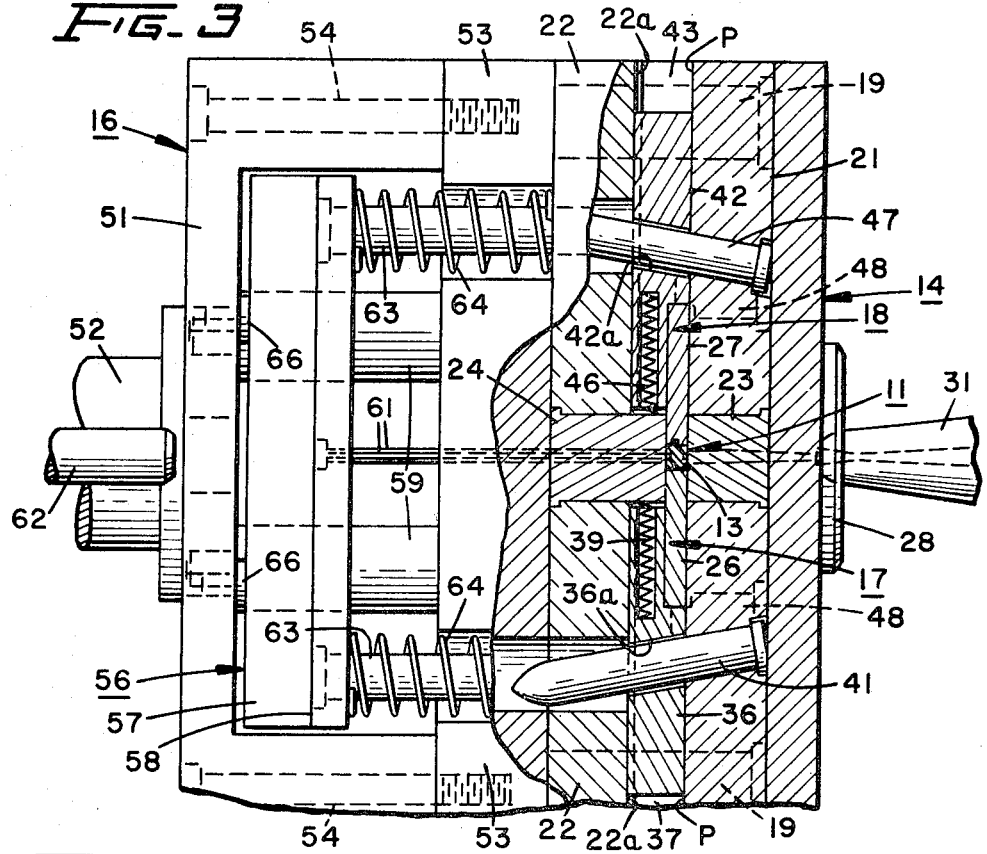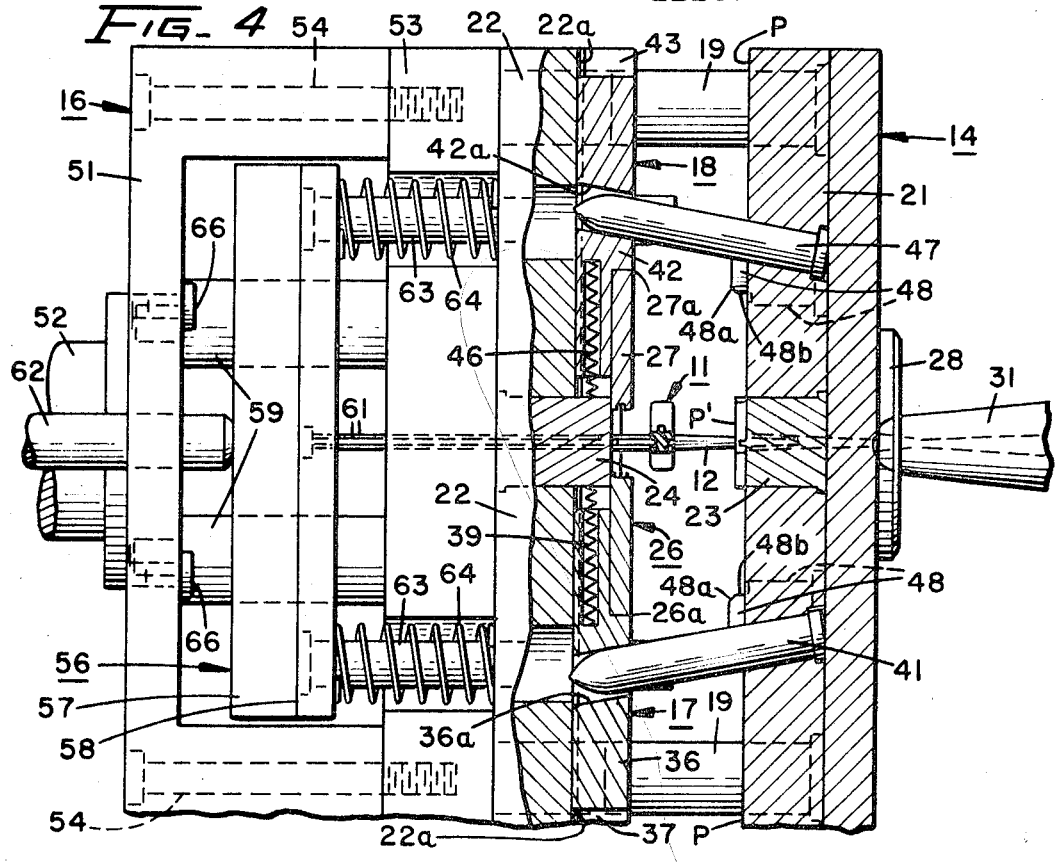

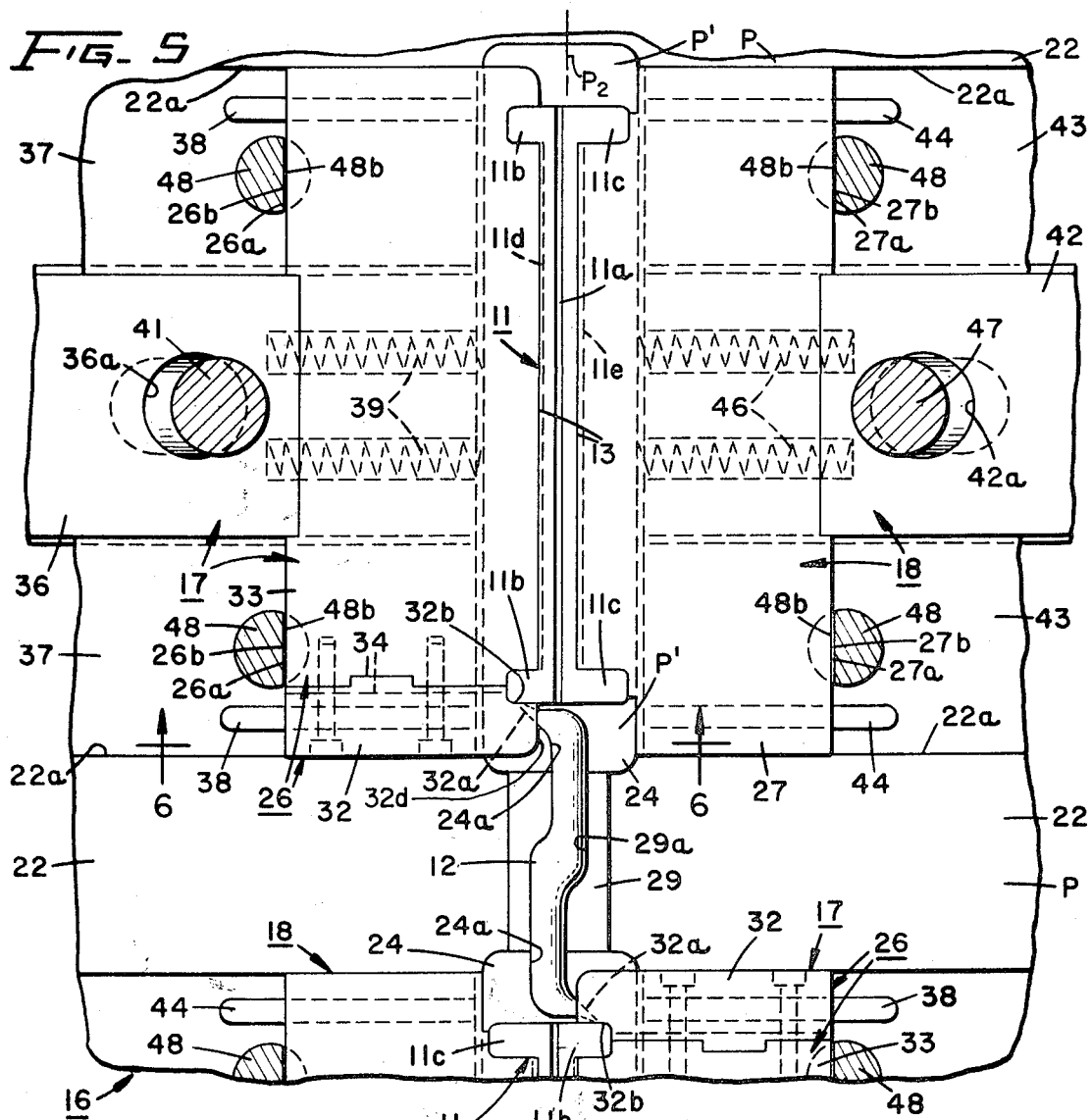
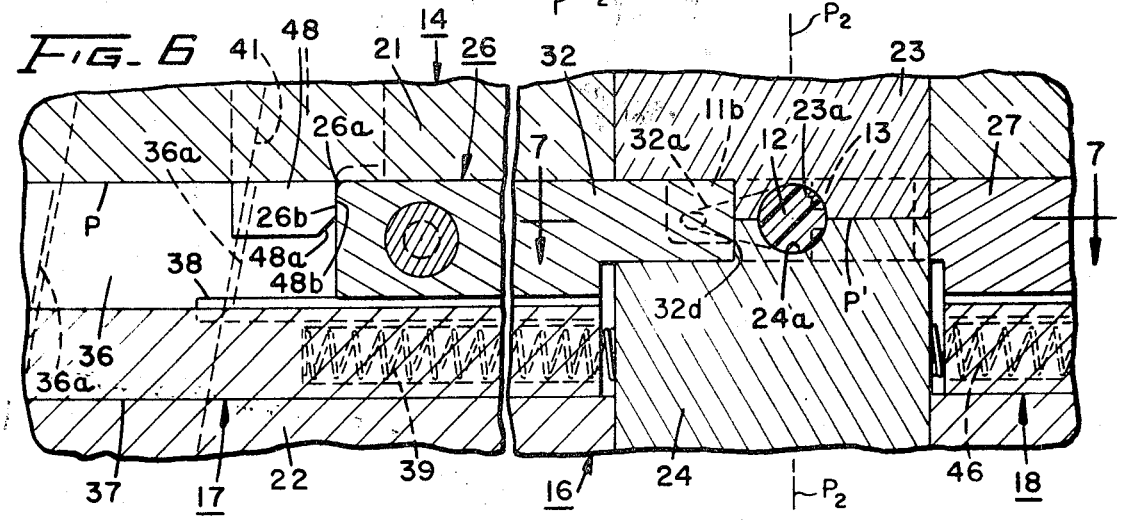

MOLDING APPARATUS HAVING A TUNNEL GATED MOVABLE MOLD MEMBER

This is a continuation, of application Ser. No. 830,617 filed June 5, 1969, now abandoned.

BACKGROUND OF THE INVENTION

1. Field of the Invention

This invention relates to apparatus for molding an article, and more particularly to apparatus for molding an article in which molding material is injected into a mold cavity through a tunnel gate which forms a shearing edge for severing the article from gate material in the tunnel gate after the molding of the article has been completed.

2. Description of the Prior Art

It is standard practice in article molding apparatus to introduce molding material into a mold cavity from a runner channel and through a tunnel gate in a mold member forming a part of the mold cavity. The tunnel gate, at its entrance into the mold cavity, defines a shearing edge for shearing gate material in the tunnel gate from the article after the molding of the article has been completed. For example, in one type of known molding apparatus this is accomplished after the apparatus has been opened and as the article is being ejected from the apparatus. The purpose of this arrangement is to eliminate the necessity of severing the article from the gate material in a separate subsequent operation.

Heretofore, however, where the article has been extremely thin in cross section it has not been possible to utilize a tunnel gate arrangement because of the limited depth of the mold cavity, and it has been necessary to use other gating arrangements. For example, known apparatus for this purpose includes an assembly of three relatively movable plates, in which a first plate and an intermediate plate define a runner system and the intermediate plate and a third plate define a mold cavity. The first plate is provided with a sprue bushing opening into the runner system and the intermediate plate is provided with a pin point gate which opens into the mold cavity and which connects the cavity to the runner system. In this apparatus the separation of the article and the gate material in the pin point gate is accomplished by rupturing the gate material as the plates are opened after a molding operation.

Further, even where the thickness of the article and the depth of the mold cavity is great enough that a tunnel gate arrangement is possible, prior known molding apparatus utilizing such an arrangement have not proven entirely satisfactory for various reasons. For example, the severing of the article from the gate material is not always accomplished cleanly, resulting in damage to the article or the leaving or a protruding portion of the gate material on the article which must then be removed from the article in a separate operation. This is particularly true in instances in which the article is relatively thin so that the depth of the mold cavity still is limited and the tunnel gate must extend at a relatively large angle with respect to the wall of the mold cavity through which it opens, whereby the shearing edge formed by the tunnel gate is not sharp enough to sever the article cleanly from the gate material.

SUMMARY OF THE INVENTION

An object of this invention is to provide new and improved apparatus for injection molding an article.

A further object of this invention is to provide new and improved apparatus for injection molding an extremely thin article.

A still further object of this invention is to provide new and improved apparatus for injection molding an article and severing gate material from the article after a molding operation.

Apparatus for carrying out the invention may include die members mounted for relative movement between an open position and a closed molding position in which they define portions of a mold cavity for molding an article, and a mold member mounted for movement parallel to a parting line of the apparatus and relative to the die members between an open position and a closed molding position in which it also defines a portion of the mold cavity. A tunnel gate is formed in the movable mold member so as to define a gate material shearing edge, the tunnel gate opening into the mold cavity substantially at the parting line of the apparatus and being aligned with a runner channel in one of the die members when the mold member is in its closed molding position, whereby molding material can be introduced into the mold cavity through the runner channel and the tunnel gate. Means is provided for moving the mold member into its closed molding position as the die members are moved to their closed molding position, and means is provided for moving the movable mold member out of its closed molding position as the die members are opened after the molding of the article. During this latter movement of the mold member the gate shearing edge thereon severs gate material in the tunnel gate from the article and the gate material is withdrawn from the tunnel gate as an integral part of runner material formed in the runner channel.

BRIEF DESCRIPTION OF THE DRAWINGS

FIG. 1 is a side elevational view of molding apparatus in accordance with the invention;

FIG. 2 is a front elevational view of the molding apparatus shown in FIG. 1;

FIG. 3 is an enlarged plan view of the molding apparatus, partially in cross section, taken along the line 3—3 of FIG. 2 and showing the apparatus in a closed molding position;

FIG. 4 is a view similar to FIG. 3 and showing the molding apparatus in an open position after the molding of an article has been completed;

FIG. 5 is a view of the portion of the molding apparatus taken along its parting line and looking in the direction of the arrows 5—5 in FIG. 2;

FIG. 6 is an enlarged cross-sectional view of a portion of the molding apparatus, taken along the line 6—6 of FIG. 5;

DETAILED DESCRIPTION

Figure 7:
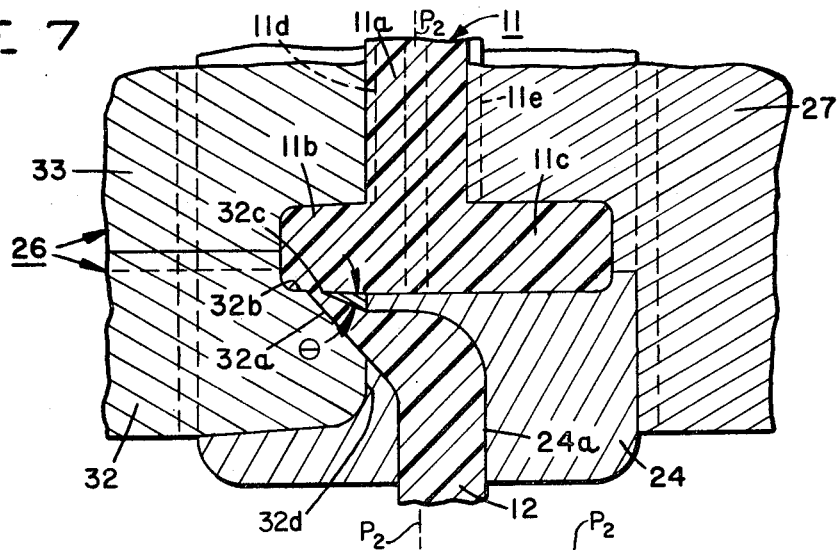
FIG. 7 is a cross-sectional view of a portion of the molding apparatus, taken along the line 7—7 of FIG. 6 and showing the apparatus in a closed molding position.
Figure 8:
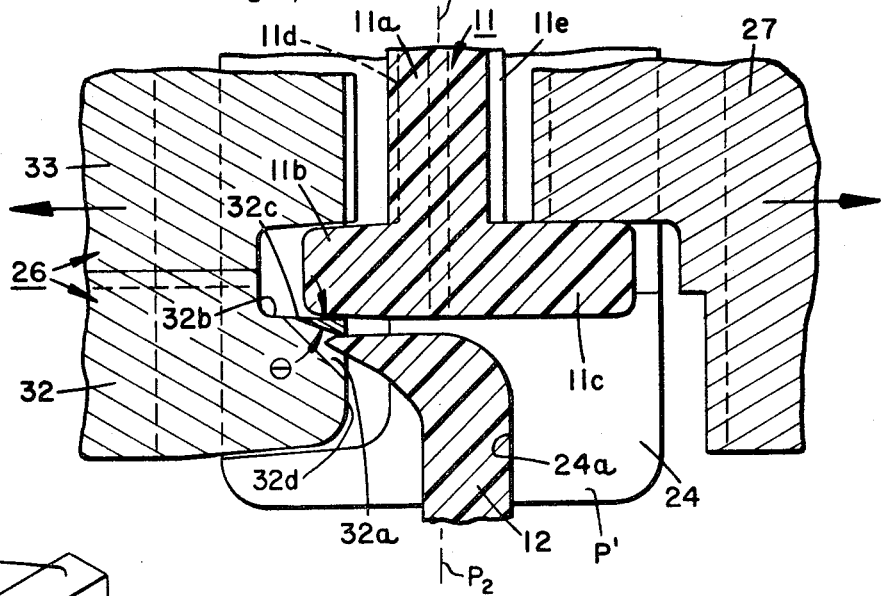
FIG. 8 is a cross-sectional view similar to FIG. 7 illustrating the manner in which the molded article is severed from the gate material.
Figure 9:
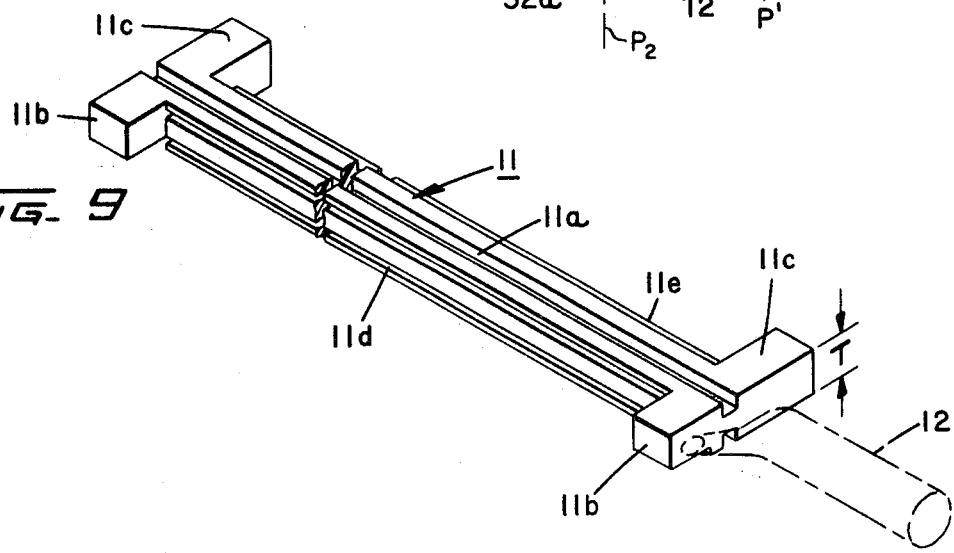
FIG. 9 is a schematic isometric view of an article which may be molded with the molding apparatus shown in FIGS. 1 through 8.

Referring to FIG. 9, it is seen that the illustrated embodiment of the invention is designed for molding a plastic article in the form of a terminal block 11 for a circuit board (not shown) used in electronic telephone switching systems. As the apparatus is opened after a molding operation, the terminal block 11 is automatically severed from associated gate, runner and sprue material 12, as illustrated in FIGS. 7 and 8. Subsequently, the terminal block 11 and the severed gate, runner and sprue material 12 are automatically ejected from the apparatus, as illustrated in FIG. 4.

Since many of the details of the terminal block 11 are not relevant to the invention, the terminal block has been shown only schematically in FIG. 9 and will be described only in a general manner. The terminal block 11, which has a relatively small overall thickness T, has a substantially H-shaped configuration and includes an elongated main body portion 11a having laterally projecting first and second lugs 11b and 11c at its opposite ends. The first lugs 11b are provided for mounting the terminal block 11 on the above-mentioned circuit board and the second lugs 11c are provided for holding a protective plastic shield (not shown) for electrical terminals (not shown) which subsequently are mounted on the terminal block. As viewed in FIG. 9, the front of the main body 11a is provided with a longitudinally extending slot 11d for receiving an end of the circuit board and the back of the main body is provided with a longitudinally extending reinforcing rib 11e.

As is best shown in FIGS. 1 and 2, the disclosed apparatus molds two of the terminal blocks 11 at a time in upper and lower mold cavities 13. The apparatus includes a fixed support in the form of a plate assembly 14, shown at the right in FIG. 2, and a movable support in the form of a yoke assembly 16, shown at the left in FIG. 2, the assemblies being designed to mate for a molding operation along a parting line P. In this connection, the yoke assembly 16 is movable relative to the fixed plate assembly 14 between a closed molding position as shown in FIGS. 2 and 3, and an open position as shown in FIG. 4. Further, upper and lower sets of slide-mold member assemblies 17 and 18 are associated with respective ones of the mold cavities 13 and are mounted on the yoke assembly 16 for movement relative thereto and parallel to the parting line P, between closed molding positions as shown in FIGS. 2 and 3 and open positions as shown in FIG. 4. The fixed plate assembly 14 has horizontally extending guide shafts 19 mounted in apertures in a plate member 21 thereof and slidably received in apertures in a plate member 22 of the yoke assembly 16, to insure proper alignment of the assemblies when the yoke assembly moves into its closed molding position.

In molding one of the terminal blocks 11, as for example in the upper mold cavity 13, the top of the terminal block body 11a as viewed in FIG. 9, which is the righthand side thereof as viewed in FIGS. 3 and 4, and certain portions of the second lugs 11c, are formed by a suitable die cavity formed in a front surface of an upper molding die 23 mounted in an opening in the plate member 21 of the fixed plate assembly 14. Similarly, the bottom of the body 11a as viewed in FIG. 9, which is the lefthand side thereof as viewed in FIGS. 3 and 4, and other portions of the second lugs 11c, are formed by a suitable die cavity formed in a front surface of an upper molding die 24 mounted in an opening in the plate member 22 of the movable yoke assembly 16. The front of the body 11a as viewed in FIG. 9, which includes the slot 11d, and portions of the first lugs 11b, are formed by suitable front die surfaces of a composite mold member 26 of the upper slide-mold member assembly 17. Similarly, the back of the body 11a as viewed in FIG. 9, which includes the reinforcing rib 11e, and additional portions of the second lugs 11c, are formed by suitable front die surfaces of a unitary mold member 27 of the upper slide-mold member assembly 18. As is apparent from FIG. 5, the mold members 26 and 27, and the opposed front die surfaces thereof, are located on opposite sides of an imaginary parting line $P_2$ extending vertically through the mold cavity 13 and perpendicular to the parting line P.

The fixed plate assembly 14 is provided with a sprue bushing 28 and the movable yoke assembly 16 includes a runner member 29 (best shown in FIGS. 2 and 5) fixedly mounted in a recess in its plate member 22. The sprue bushing 28 receives an injection nozzle 31 and, when the apparatus has been closed for a molding operation, communicates with a runner channel 29a (FIGS. 2 and 5) in the runner member 29. As is best illustrated in FIGS. 5 and 6, the opposite ends of the runner channel 29a communicate with respective opposed runner channels 23a (shown only in FIG. 6) and 24a in the upper and lower molding dies 23 (shown only in FIG. 6) and 24.

Referring to FIG. 5, it is seen that the composite mold member 26 of each slide-mold member assembly 17 includes a relatively small mold part 32 and a relatively large mold part 33. The mold parts 32 and 33 are provided with suitable interlocking key and slot connections 34 which extend perpendicular to one another to preclude relative movement between the mold parts, and the small mold part is removably secured to the large mold part by suitable screws so as to be readily replaceable. As is illustrated in FIGS. 5 and 6, the small mold part 32 is provided with a tunnel gate 32a extending from a front surface 32d and opening through a molding surface or molding cavity wall 32b (shown only in FIG. 5), which is perpendicular to both of the parting lines P and $P_2$. The tunnel gate 32a becomes aligned with the opposed runner channels 23a (shown only in FIG. 6) and 24a in the adjacent molding dies 23 (shown only in FIG. 6) and 24 when the composite mold member 26 is in its closed molding position, whereby molding material can be introduced into its associated mold cavity 13 through the runner channels and the tunnel gate. The tunnel gate 32a extends parallel to the parting line P of the apparatus and opens into the mold cavity 13 at a parting line P' (best shown in FIG. 6) of the molding dies 23 and 24 when the apparatus is in its closed molding position. Thus, as is apparent from FIGS. 7, 8 and 9, the relatively small thickness T (FIG. 9) of the terminal block 11 has no limiting effect on the angle of inclination of the tunnel gate 32a relative to the molding surface 32b, and the tunnel gate can and does intersect the molding surface at a relatively sharp angle $\theta$, such as 25°, to provide a relatively sharp gate material shearing edge 32c.

In addition to the composite mold member 26, each of the slide-mold member assemblies 17 includes a relatively narrow slide member 36, with the large mold part 33 of the composite mold member 26 being suitably secured to the slide member on a ledge portion thereof. The slide member 36 is mounted for reciprocal movement parallel to the parting line P of the apparatus in a guideway formed by a pair of spaced guide plates 37 suitably secured to the yoke assembly plate member 22 in a respective one of a plurality of trough like channels 22a in the plate member. During the reciprocal movement of the slide member 36 and thus of the composite mold member 26, the mold member travels in a slot defined in part by side surfaces of the channel 22a, and rides on elongated outwardly projecting insert rails 38 in the guide plates 37 and formed of a wear resistant, low friction material, such as phosphor bronze.

Each slide-mold member assembly 17 is continuously urged toward its open position in FIG. 4 by a pair of coil springs 39 disposed in recesses in its slide member 36 and bearing against the adjacent molding die 24. During the initial portion of the movement of the yoke assembly 16 toward its closed molding position in FIG. 3, the slide-mold member assembly 17 is cammed inward against the action of the coil springs 39 by a camming pin 41, the camming pin being mounted in a suitable aperture in the plate member 21 of the fixed plate assembly 14 and extending at an angle to the direction of closing movement of the yoke assembly and through an inclined oversize aperture 36a in the slide member 36 for this purpose.

The construction and operation of each of the slide-mold member assemblies 18 is similar to that of the slide-mold member assemblies 17. Thus, each of the unitary mold members 27 is suitably secured to a ledge portion of a relatively narrow slide member 42 which is reciprocal in a guideway formed by laterally spaced guide plates 43 fixedly mounted in a respective one of the channels 22a in the plate member 22. Further, the unitary mold member 27 is movable in a slot defined by surface portions of the channel 22a, and rides in insert rails 44 in the guide plates 43. Each slide-mold member assembly 18 also is continuously biased toward its open position by a pair of coil springs 46 disposed in recesses in its slide member 42 and, during the initial closing movement of the yoke assembly 16, is moved inward by a camming pin 47 which extends through an inclined oversize aperture 42a in the slide member.

Referring to FIGS. 3, 4, 5 and 6, it is seen that the fixed plate assembly 14 is provided with a plurality of cam-latch members 48 which are fixedly mounted in suitable apertures in the plate member 21 thereof, for positively camming respective ones of the slide-mold member assemblies 17 and 18 into their innermost positions and for subsequently positively latching the assemblies in their molding positions for a molding operation. In this connection, the cam-latch members 48 are provided with suitable camming surfaces 48a (FIGS. 4 and 6) which are engageable by edge portions 26a (FIGS. 4, 5 and 6) of the composite mold members 26 and edge portions 27a (FIGS. 4 and 5) of the unitary mold members 27 as the yoke assembly 16 nears its closed molding position, and latching surfaces 48b (FIGS. 5 and 6) which subsequently become engaged with surface portions 26b and 27b of the mold members as the yoke assembly reaches its closed molding position.

From the plan view of the apparatus in FIG. 3, it is seen that the movable yoke assembly 16 includes a C-shaped yoke member 51 having horizontally spaced parallel legs and a vertical bight portion to which a piston rod 52 of an actuating mechanism (not shown) is suitably secured. The legs of the yoke member 51 are butted against a plate member 53 and the yoke member is secured to the plate member by screws 54. The plate member 53 is suitably secured to the yoke assembly plate member 22 and these two plate members are provided with aligned apertures for receiving the camming pins 41 and 47 as the yoke assembly 16 is moved to its closed molding position.

An ejector pin assembly 56 is mounted in the space between the bight portion of the yoke member 51 and the plate member 53 for horizontal movement relative to these members. The ejector pin assembly 56 includes two rectangular plate members 57 and 58 which are suitably secured together and which are slidable guide bushings 59 extending therethrough and fixedly mounted between the bight portion of the yoke member 51 and the plate member 53. The interconnected plate members 57 and 58 carry a plurality of sprue, runner and terminal block ejector pins 61 which slidably extend through respective apertures in the plate members 22 and 53, and respective apertures in the molding dies 24 and the runner member 29. As the yoke assembly 16 is opened after a molding operation, operation of the ejector pin assembly 56 so as to eject the molded terminal blocks 11 and the associated gate, runner and sprue material 12 from the yoke assembly, is effected by fixed stop pins 62 receivable through apertures in the bight portion of the yoke member 51 and engageable with the ejector pin assembly plate member 57 in a well known manner.

The plate members 57 and 58 of the ejector pin assembly 56 also carry a plurality of reset pins 63 which extend through apertures in the plate members 22 and 53 and which are engageable with the plate member 21 of the fixed plate assembly 14 when the yoke assembly 16 is closed, to insure resetting of the ejector pin assembly 56 to its position shown in FIG. 3. However, unless binding of the ejector pin assembly 56 occurs, the resetting thereof normally will be accomplished by coil springs 64 disposed about the reset pins 63 between the plate members 22 and 58. As is best shown in FIGS. 2 and 3, the location of the free ends of the ejector pins 61 relative to the mold cavities 13 when the yoke assembly 16 is in its closed molding position, is determined by a plurality of spacer members 66 forcefitted into apertures in the bight portion of the yoke member 51 and engageable by the plate member 57.

OPERATION

In operation, the yoke assembly 16 is moved from its open position, as shown in FIG. 4, to its closed molding position, as shown in FIGS. 2 and 3, by the piston rod 52. During this movement the reset springs 64 of the ejector pin assembly 56 cause it to move to the left in FIG. 4 and into engagement with the spacer members 66, thereby retracting the ejector pins 61. In the event of binding of the ejector pin assembly 56, positive retraction of the assembly is assured by its reset pins 63 engaging the plate member 21 of the fixed plate assembly 14.

During the initial portion of the movement of the yoke assembly 16 to its closed molding position, the camming pins 41 and 47 move the slide-mold member assemblies 17 and 18 inward against the action of their biasing springs 39 and 46. As the yoke assembly 16 nears its closed molding position, the edge portions 26a (FIGS. 4, 5 and 6) of the composite mold members 26 and the edge portions 27a (FIGS. 4 and 5) of the unitary mold members 27 engage the camming surfaces 48a (FIGS. 4 and 6) of their respective cam-latch members 48. Thus, as the yoke assembly 16 continues to move, the camming surfaces 48a cam the slide-mold member assemblies 17 and 18 into their innermost positions and transversely relative to the camming pins 41 and 47, this inward relative movement being permitted by the oversize nature of the camming pin apertures 36a and 42a in the slide members 36 and 42. The edge portions 26a and 27a of the mold members 26 and 27 then ride past the camming surfaces 48a and the surface portions 26b and 27b of the mold members come into slidable mating engagement with the latching surfaces 48b of the cam latch members 48, whereupon inward movement of the mold members relative to the yoke assembly 16 ceases and they merely move with the yoke assembly into its closed molding position and become positively locked into their molding positions by the cam-latch members. As is best shown in FIGS. 5, 6 and 7, the tunnel gate 32a in the mold part 32 of each of the composite mold members 26 now is in alignment with the opposed runner channels 23a (FIG. 6) and 24a in the adjacent molding dies 23 and 24.

Molding material then is injected into the mold cavities 13 from the nozzle 31 (FIG. 3), through the sprue bushing 28, the runner channel 29a in the runner member 29 (best shown in FIGS. 2 and 5), the opposed runner channels 23a (FIG. 6) and 24a in the molding dies 23 and 24, and the tunnel gates 32a, to form a pair of the terminal blocks 11. When the molding material has cooled sufficiently, the piston rod 52 moves the yoke assembly 16 toward its open position shown in FIG. 4.

During the initial portion of the opening movement of the yoke assembly 16, the cam-latch members 48 retain the slide-mold member assemblies 17 and 18 in their innermost positions and in firm engagement with the molded terminal blocks 11, this again being possible because of the oversize nature of the camming pin apertures 36a and 42a in the slide members 36 and 42. Accordingly, with the initial opening movement of the yoke assembly 16 the composite and unitary mold members 26 and 27 of the slide-mold member assemblies 17 and 18 cause the terminal blocks 11, and the runner and sprue material 12, to be broken free of the molding dies 23 and the sprue bushing 28 in the fixed plate assembly 14, and to move in unison with the yoke assembly 16. In the illustrated embodiment of the invention, this function of the mold members 26 and 27 is facilitated by the interlocking action between the mold members and the slots 11d and the reinforcing ribs 11e of terminal blocks 11.

As the opening movement of the yoke assembly 16 continues, the edge portions 26a and 27a of the composite and unitary mold members 26 and 27 clear the latching surfaces 48b of the cam-latch members 48. The biasing springs 39 and 46 then begin to move the slide-mold member assemblies 17 and 18 toward their open positions in FIG. 4 and relative to the yoke assembly 16 in a direction parallel to the parting line P.

Referring to FIGS. 7 and 8, it is seen that as the slide-mold member assembly 17 associated with each mold cavity 13 begins its outward movement, the composite mold member 26 thereof breaks away from the molded terminal block 11, which is still fixed to its associated molding die 24 and the shearing edge 32c defined by the tunnel gate 32a in its small mold part 32 shears the gate material 12 in the tunnel gate from the terminal block flush with a surface thereof. Then, as the outward movement of the slide-mold member assembly 17 continues, the gate material 12 in the tunnel gate 32a becomes withdrawn therefrom as an integral part of the runner material 12 in the adjacent runner channels 23a and 24a.

As the yoke assembly 16 continues to open, the molded terminal blocks 11 and the severed gate, runner and sprue material 12 adhere to the molding dies 24 and the runner member 29, and travel with the yoke assembly until the plate member 57 of the ejector pin assembly 56 engages the stop pins 62. The remainder of the yoke assembly 16 then continues to be moved relative to the ejector pin assembly 56, whereby the ejector pins 61 eject the terminal blocks 11 and the gate, runner and sprue material 12 from the yoke assembly in a well known manner. Since the terminal blocks 11 have been severed from the gate, runner and sprue material 12, each of the terminal blocks and the gate, runner and sprue material then may drop by gravity into suitable respective receptacles (not shown) and the apparatus is ready to be closed for the next molding operation.

What is claimed is:

1. Apparatus for molding an article, which comprises:
    first die means having a first die cavity formed in a front surface thereof;
    second die means having a second die cavity formed in a front surface thereof;
    means movably mounting said second die means with the first and second die cavities positioned on opposite sides of a first parting line to define a portion of a molding cavity;
    a first mold member slidably mounted on the front of said second die means, said first mold member having a front die surface defining another portion of the molding cavity and located on one side of a second parting line which is perpendicular to the first parting line;
    a second mold member slidably mounted on the front of said second die means, said second mold member having a front die surface positioned opposite to said first mold member die surface, to define another portion of the molding cavity; said second mold member having a front surface located on the opposite side of the second parting line and having a molding cavity wall extending substantially perpendicular to both of the parting lines, and said second mold member having a tunnel gate extending from the front surface of said second mold member substantially parallel to the first parting line, through said second mold member, and terminating at an acute angle with the perpendicular molding cavity wall in said second mold member to form a relatively sharp shearing edge;
    at least one of said first and second die means having a runner channel formed in the front surface thereof at the first parting line and extending to said tunnel gate when said second mold member is in a closed molding position;
    means for injecting molding material through said runner channel and said tunnel gate into the molding cavity;
    means for moving said second die means away from said first die means to pull the molded article from the first die cavity;
    means for positively retaining said first and second mold members against movement away from the article during an initial movement of said second die means away from said first die means; and means rendered effective after the initial movement of said second die means, for sliding said first and second mold members away from each other and away from the article being held fixed in the second die cavity; said movement of said second mold member moving the shearing edge thereon to sever the molded article from the molding material in the runnel gate.

2. Apparatus for molding an article, as defined in claim 1, in which:

said mold member retaining means is a latch means for holding said first and second mold members against sliding movement during the initial movement of said second die means away from said first die means.

3. Apparatus for molding an article, as defined in claim 2, wherein said means for moving said first and second mold members includes:

first and second slide means mounting said first and second mold members;

a pair of angularly disposed pins extending from said first die means in opposed directions; and said first and second slide means including a pair of apertures for receiving said pins, said apertures having a larger dimension than said pins to permit said second die means to move away from said first die means before the walls of said apertures react against said pins to move said first and second mold members apart.

* * * * *